United States Patent
Okabayashi et al.

(10) Patent No.: US 7,657,157 B2
(45) Date of Patent: Feb. 2, 2010

(54) STILL IMAGE PRODUCING APPARATUS

(75) Inventors: Ichiro Okabayashi, Ikoma (JP); Yasuhiro Mori, Izumi (JP)

(73) Assignee: Panasonic Corporation, Osaka (JP)

( * ) Notice: Subject to any disclaimer, the term of this patent is extended or adjusted under 35 U.S.C. 154(b) by 798 days.

(21) Appl. No.: 11/033,904

(22) Filed: Jan. 13, 2005

(65) Prior Publication Data

US 2005/0158037 A1  Jul. 21, 2005

(30) Foreign Application Priority Data

Jan. 15, 2004  (JP) .............. 2004-007818

(51) Int. Cl.
*H04N 7/00* (2006.01)
*H04N 5/93* (2006.01)
*G11B 27/00* (2006.01)
*H04N 5/00* (2006.01)
*G09G 5/00* (2006.01)

(52) U.S. Cl. ............. 386/95; 386/54; 386/119; 345/587; 345/656; 345/655

(58) Field of Classification Search ......... 348/587, 348/656, 655; 386/95, 54, 119
See application file for complete search history.

(56) References Cited

U.S. PATENT DOCUMENTS 6,091,836 A * 7/2000 Takano et al. ............ 382/118
6,463,432 B1   10/2002 Murakawa
6,850,891 B1 *  2/2005 Forman .................... 705/7
2004/0100487 A1 *  5/2004 Mori et al. ............... 345/724

FOREIGN PATENT DOCUMENTS

| JP | 11-224262   | 8/1999  |
|----|-------------|---------|
| JP | 2000-67057  | 3/2000  |
| JP | 2001-103415 | 4/2001  |
| JP | 2002-92019  | 3/2002  |
| JP | 2002-99574  | 4/2002  |
| JP | 2003-309815 | 10/2003 |

* cited by examiner

*Primary Examiner*—Thai Tran
*Assistant Examiner*—Daquan Zhao
(74) *Attorney, Agent, or Firm*—Wenderoth, Lind and Ponack, L.L.P.

(57) ABSTRACT

A still image producing apparatus in which a user selects one piece of information, and production of still images and music associated with the mood in time of the production is provided. A still image producing apparatus 100 comprises: an image feature extraction unit 102 which analyzes image data, so as to extract feature; a music feature extraction unit 106 which extracts a music feature quantity from music data; and a mapping process unit 109 which uses each feature, so as to respectively map image data and music data on each sensitivity map using two axes. The user selects, from the sensitivity map, via a menu input unit 111, a quadrant for music or images desired in a slide show. Thus, the slide show associated with the mood is automatically produced in a slide show generation unit 110.

17 Claims, 18 Drawing Sheets

FIG. 6
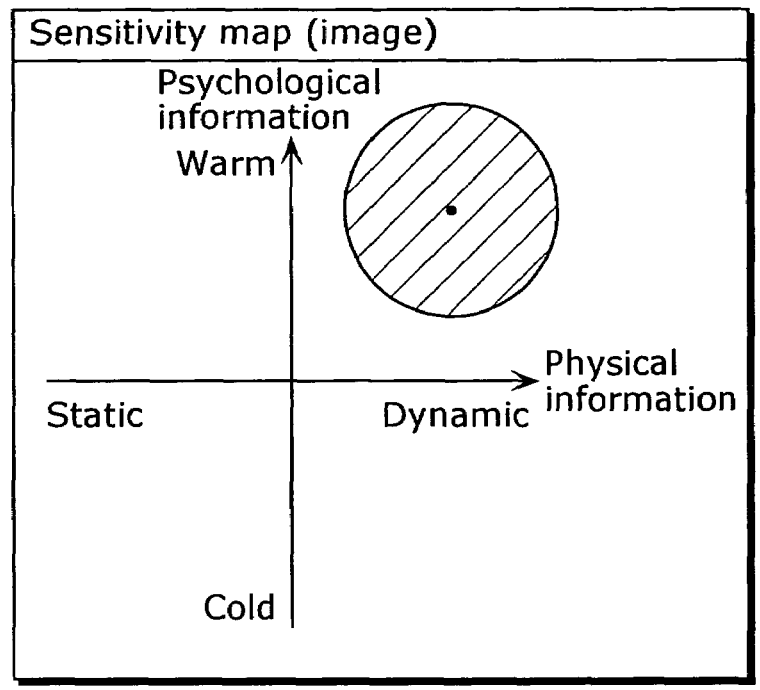
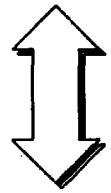
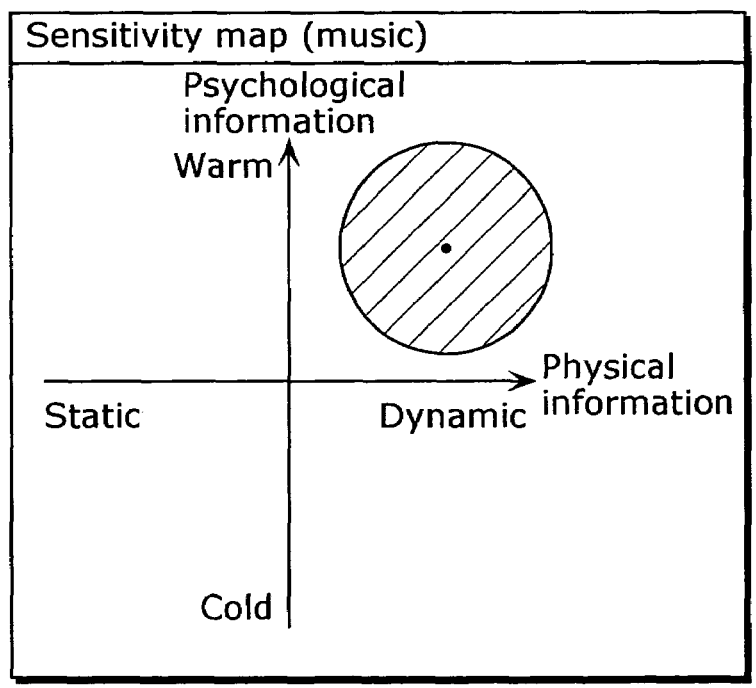

| Album | | |
|---|---|---|
| Album title | Date | Number |
| Domestic travel (Kyushu) | 2003/01··· | 54 |
| Overseas travel (the U.S.) | 2003/04··· | 170 |
| Sports festival | 2002/10··· | 30 |
| Landscape picture | 2002/08··· | 45 |
| ⋮ | ⋮ | ⋮ |

STILL IMAGE PRODUCING APPARATUS

BACKGROUND OF THE INVENTION (1) Field of the Invention

The present invention relates to a still image producing apparatus which records and produces digital images, in particular, to a still image producing apparatus having a slide show function for consecutively displaying a plurality of digital images.

(2) Description of the Related Art

As a conventional method for consecutively reproducing still images, there is a display method, called a slide show, for consecutively displaying still images per certain period of time. For example, the above mentioned slide show is realized by PC software such as a photo cinema and a movie shaker, and a camera cellular phone.

Here, the slide show means, a so-called digital picture story show in which a digital still image to be displayed is switched (i) per certain period of time or (ii) by a trigger such as a user's specification, as well as a slide projector. Also, in recent years, entertainment features in some applications have been improved, by adding (i) background music (BGM) and (ii) transitions such as fading, wiping and rotating when switching digital still images.

As an example of the conventional slide show apparatus, there is one which consecutively produces still images using a CD-ROM (for example, refer to Laid-Open Japanese Patent application No. 2001-103415, pp 3-5 and FIG. 1). FIG. 18 is a structure diagram of a conventional slide show apparatus 1800 described in the Laid-Open Japanese patent application No. 2001-103415.

In the slide show apparatus 1800, a CD-ROM 1806 is set in a CD-ROM reading unit 1805, and the activation of a slide show performing program 1806a is specified by an input specification unit 1802. An operation control unit 1801 reads in the slide show performing program 1806a, so as to function as a slide show performing unit. When performing a slide show, the operation control unit 1801 first reads in an order table 1806b, and extracts image files, from an image file group 1806c, in such order as predetermined in the order table 1806b, so as to cause a display unit 1803 to display the images. A hard disk 1804 saves various data according to need.

However, the conventional slide show reproducing apparatus only produces image files according to the order table. And, there is a problem that the above mentioned slide show is predictable, thus not interesting to a user. Also, another problem is that there are few variations in the image production. This is the same problem in the case where BGM is played along with the slide show.

Moreover, according to the conventional slide show reproducing apparatus, communication using images between slide show apparatuses is not considered at all. A slide show which supports recent networking is not provided, either.

SUMMARY OF THE INVENTION

An object of the present invention, in view of the above mentioned problems, is to provide a still image producing apparatus which can automatically produce a slide show in which still images and music are harmonized according to the mood in time of the production.

Another object of the present invention is to provide a still image producing apparatus which can not only display still images, but also realize a communication using the still images.

In order to solve the conventional problems, a still image producing apparatus according to the present invention produces a slide show using image data and music data, the apparatus comprising: a music feature extraction unit operable to extract a music feature quantity from the music data; an image feature extraction unit operable to extract an image feature quantity from the image data; a mapping process unit operable to map the music data and the image data on each of N-dimensional maps (N is a natural number) using the music feature quantity and the image feature quantity; a reception unit operable to receive, from a user, a selection of the music data or the image data which is arranged on the map, and requested a slide show production; and a production unit operable to produce the music data and the image data mapped by said mapping process unit.

Also, in said mapping process unit, a coordinate system in which the image data is mapped and a coordinate system in which the music data is mapped indicate the same feature quantity.

Thus, according to the above mentioned still image producing apparatus, the image feature quantity is extracted from the image data, and the music feature quantity is extracted from the music data, so as to map the extracted data on each coordinate of the coaxial system. Then, the user selects music or images associated with the mood on the map, and the slide show using the music and images associated with the mood is automatically produced.

In the case where music data is selected by a user, said production unit preferentially produces the selected music data and image data located in the same quadrant as the music data on the map. And, in the case where image data is selected by a user, said production unit preferentially produces the selected image data and music data located in the same quadrant as the image data on the map.

Thus, according to the still image producing apparatus of the present invention, the image data and music data are mapped using the physical information and psychological information. Therefore, the sensitivity map associated with the mood in time of the user's production can be generated. And, the map can be customized to the user's preferences.

Moreover, in the still image producing apparatus according to the present invention, said mapping process unit predetermines and arranges a style which is the mood of the slide show associated with each quadrant on the map, and said production unit preferentially produces the music data and the image data located in the same quadrant as the style arranged on the map, the style being selected by said input unit.

Thus, if the user only selects the style, the slide show in which music and images are appropriately selected can be produced.

In order to achieve the above mentioned object, the present invention can be realized as (i) a still image producing method comprising, as steps, the characteristic component units of the still image producing apparatus, or as (ii) a program which includes all of the above mentioned steps. And, the above mentioned program can not only be stored in a ROM (a computer-readable storage medium) and the like included in the still image producing apparatus, but also distributed via a recording medium such as a CD-ROM (a computer-readable storage medium) or a communication network.

As described above, the still image producing apparatus according to the present invention (i) extracts the sensitivity information of the images, the emotional information of the subject persons, and the sensitivity information of the music, and (ii) maps the music and images on the same axis, so as to produce a slide show in which the music and images are harmonized.

Further Information about Technical Background to this Application

The disclosure of Japanese Patent Application No. 2004-007818 filed on Jan. 15, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 is a diagram showing the relation between an image sensitivity map and a music sensitivity map displayed in the still image producing apparatus according to the first embodiment;

FIG. 15 is an example of an album screen which is one of the screen types of the still image producing apparatus according to the second embodiment;

DESCRIPTION OF THE PREFERRED EMBODIMENT(S)

Figure 1:
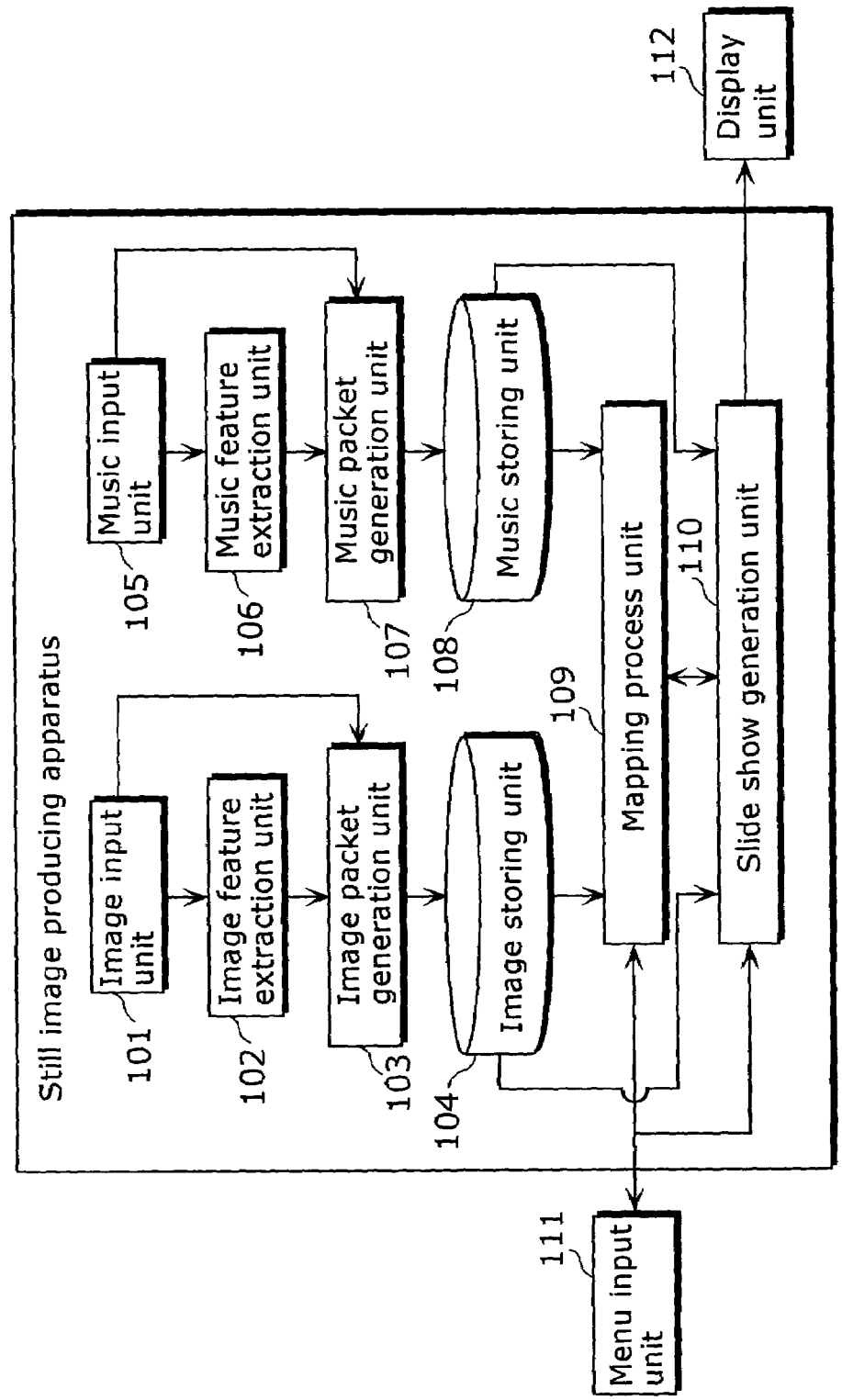
FIG. 1 is a structure diagram showing the still image producing apparatus according to the first embodiment.

The embodiments of the present invention will be explained referring to the drawings as follows.

First Embodiment

According to the still image producing apparatus of the first embodiment, one of images or music is selected from a sensitivity map so as to produce a slide show in which music and images are automatically harmonized.

The music data used in the explanation of the present embodiment may be one of (i) wave format such as Advanced Audio Coding (AAC) and MPEG Audio Library 3 (MP3) and (ii) data format such as Musical Instruments Digital Interface (MIDI). As the image data, mainly digital images taken by a digital still camera are used, but moving images and Computer Graphics (CG) may be used. Also, such images are not limited to the ones taken by the digital still camera, and may be acquired from marketing content, Website download and broadcast. The above mentioned image data is Joint Photographic Experts Group (JPEG) standard, bitmap and the like.

FIG. 1 is a block diagram showing the still image producing apparatus 100 according to the first embodiment.

An image input unit 101 is a processing unit which inputs image data. An image feature extraction unit 102 is a processing unit which analyzes image data and extracts an image feature quantity from the image. An image packet generation unit 103 generates image packets by adding the image feature quantity extracted in the image feature extraction unit 102 to the data consisting of image ID and image data. An image storing unit 104 stores the image packets generated by the image packet generation unit.

A music input unit 105 is a processing unit which inputs music data. A music feature extraction unit 106 extracts a music feature quantity from the music data. A music packet generation unit 107 generates music packets by adding the music feature quantity extracted in the music feature extraction unit 106 to the data consisting of music ID and music data. A music storing unit 108 stores the generated music packets.

A mapping process unit 109 respectively maps image data and music data, using the extracted image feature quantity and music feature quantity, on a sensitivity map in which two axes of psychological information and physical information are used. A slide show generation unit 110 generates a slide show according to the conditions inputted by the menu input unit 111. A display unit 112 displays the slide show generated in the slide show generation unit on the screen. A menu input unit 111 is an interface for a user to operate menu so as to generate a slide show.

Also, in FIG. 1, the image packets and music packets are stored into the image storing unit 104 and music storing unit 108 as follows.

The image data is inputted from the image input unit 101, and the image feature quantity is extracted in the image feature extraction unit 102. Then, in the image packet generation unit 103, (i) the image ID which is a unique number for identifying the image, (ii) the image feature quantity which is the above mentioned extraction result, and (iii) the original data are transformed into the image packet. And, the generated image packet is stored into the image storing unit 104.

In addition, the music data is inputted from the music input unit 105, and the music feature quantity is extracted in the music feature extraction unit 106. Then, in the music packet generation unit 107, (i) the music ID which is a unique number for identifying music, (ii) the music feature quantity which is the above mentioned extraction result, and (iii) the original music data are transformed into the music packet. And, the generated music packet is stored into the music storing unit 108.

Figure 2:
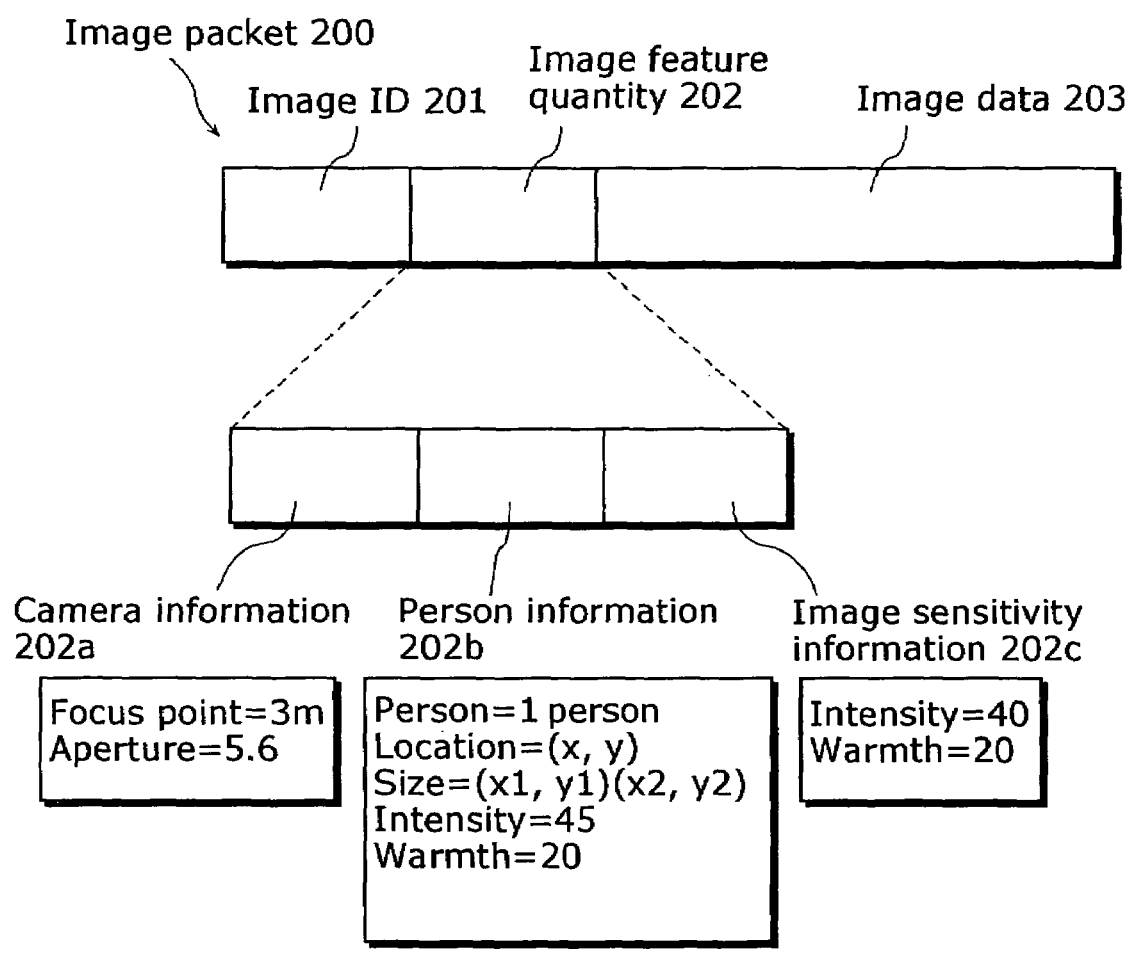
FIG. 2 is a structure diagram showing an image packet including data extracted in an image feature extraction unit according to the first embodiment.

FIG. 2 is a structure diagram of an image packet 200 including the data extracted in the image feature extraction unit 102 according to the first embodiment.

The image packet 200 includes: an image ID 201 which is a specific identification number for each digital image; an image feature quantity 202 consisting of the image data extracted in the image feature extraction unit 102; and the image data 203 which is the entity data of the image.

The image feature quantity 202 includes: camera information 202*a*; person information 202*b*; and image sensitivity information 202*c*.

The camera information 202*a* is physical camera conditions such as focal length, aperture value and use or non-use of strobe. The person information 202*b* consists of the number of people in the image, location, size and emotional information extracted from human countenance. The image sensitivity information 202*c* indicates sensitivity extracted from the image data. The mapping process unit 109 calculates, as scores, the degrees of the person's emotion and the image sensitivity, so as to map the degrees on the two axes of intensity and warmth. In the case where the maximum score of the image sensitivity information 202*c* is 50 in FIG. 2, the intensity score of 40 and the warmth score of 20 indicate "a very dynamic and slightly warm state".

Figure 3:
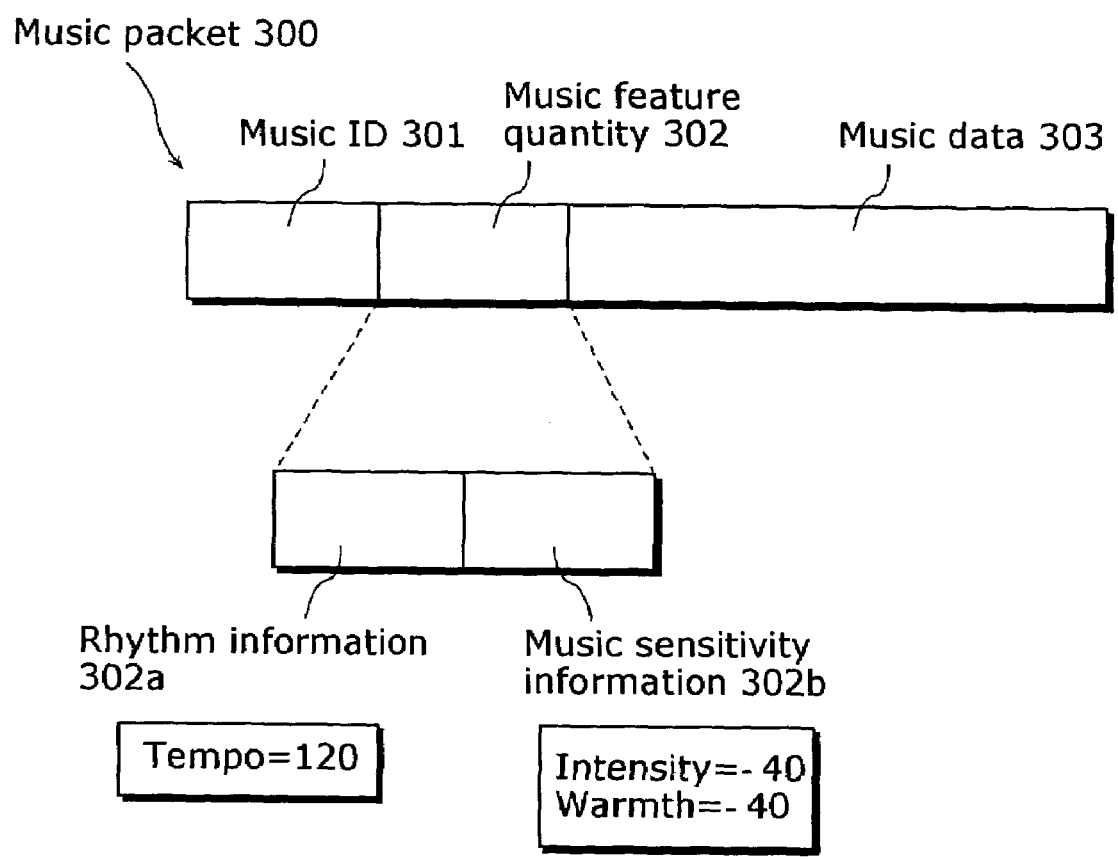
FIG. 3 is a structure diagram showing a music packet including extraction information extracted in a music feature extraction unit according to the first embodiment.

FIG. 3 is a structure diagram showing a music packet 300 which includes the extraction information extracted in the music feature extraction unit 106 according to the first embodiment.

The above mentioned music packet 300 includes: a music ID 301 which is a specific identification number for each song; a music feature quantity 302 extracted in the music feature extraction unit 106; and music data 303 which is the entity data of the music.

In the above mentioned music packet 300, the music feature quantity 302 includes rhythm information 302*a* and music sensitivity information 302*b*. The rhythm information 302*a* is a tempo indicating the music speed, rhythm, and the like. The music sensitivity information 302*b* indicates sensitivity extracted from the music data. The mapping process unit 109 calculates, as a score, the degree of the music sensitivity so as to map the score on the two axes of intensity and warmth. In the case where the maximum score of the music sensitivity information 302*b* is 50, the intensity score of −40 and the warmth score of −40 indicate "a very static and cold state".

Figure 4:
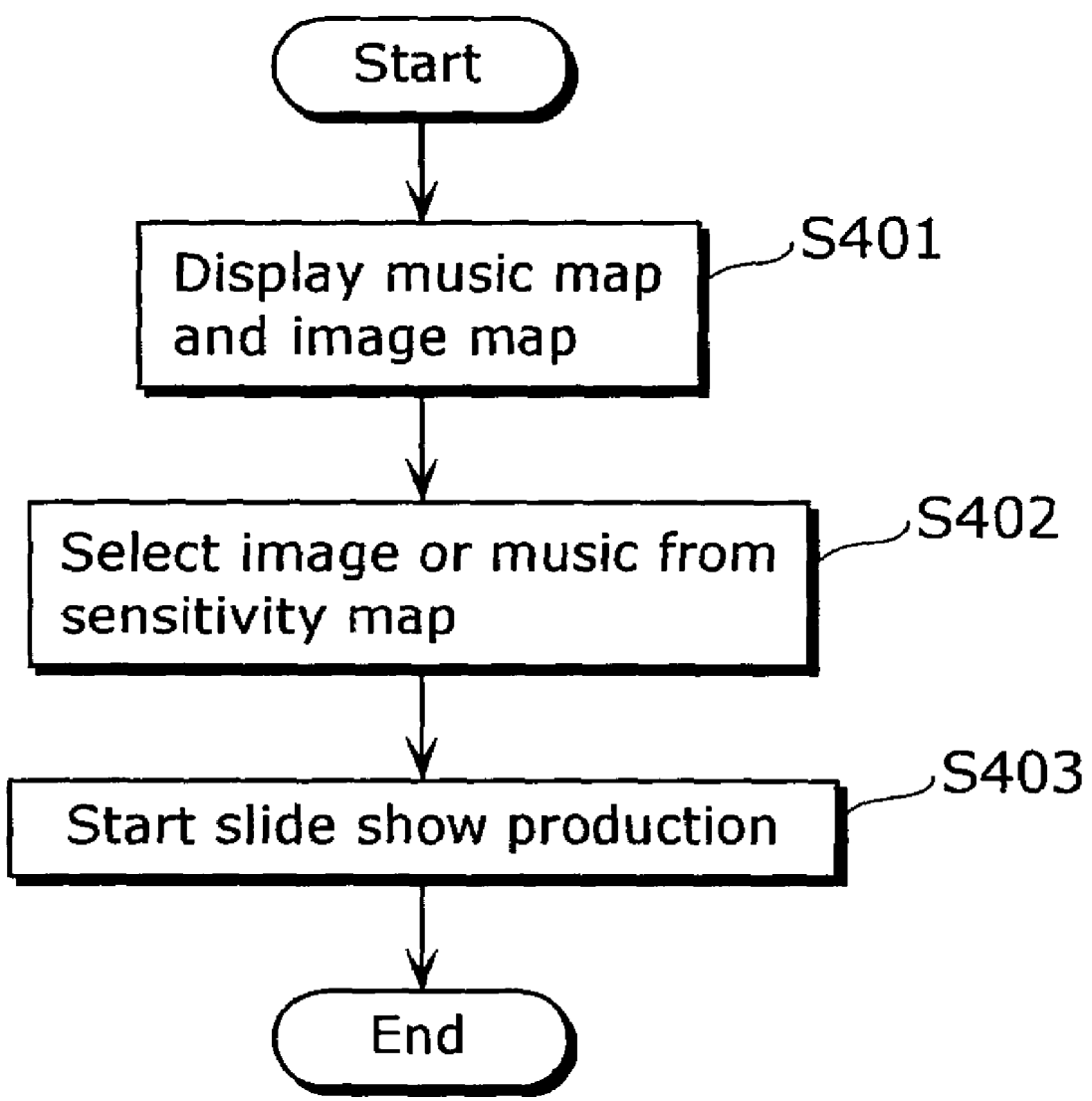
FIG. 4 is a flow chart showing the user's procedures on the still image producing apparatus according to the first embodiment.

FIG. 4 is a flow chart showing a user's procedures on the still image producing apparatus 100 according to the first embodiment.

First, in order to make selections at the start of a slide show, a user selects a menu screen via a menu input unit 111 (S401). In such case as described above, (i) when specifying a slide show based on an image, an image folder is selected; and (ii) when specifying a slide show based on music, a music folder is selected. Here, the user specifies (i) an image folder or an individual image for the image, and (ii) a song per se for the music.

Next, the user selects, from a sensitivity map, music or an image which exist in the location associated with the feeling and mood of the time, via the menu input unit 111 such as a remote control and a mouse (S402).

After the above mentioned selection of the location is ended, the slide show generation unit 110 (i) generates a slide show in which the music and image data of the same quadrant is used, according to the specification from the menu input unit 111, and (ii) outputs the generated slide show from the display unit 112 (S403). Here, in the above mentioned slide show, (i) the digital images are read out from the image storing unit 104, and (ii) the music is read out from the music storing unit 108, so as to produce the images along with the music.

Also, in the above mentioned slide show, digital images are not simply displayed consecutively, but visual effects, along with the music, such as pan, zoom, enlargement, reduction and color change are provided to the images. Thereby, an uplifting mood can be presented. In selecting the above mentioned visual effects, the feature of the images and music are used.

Figure 5:
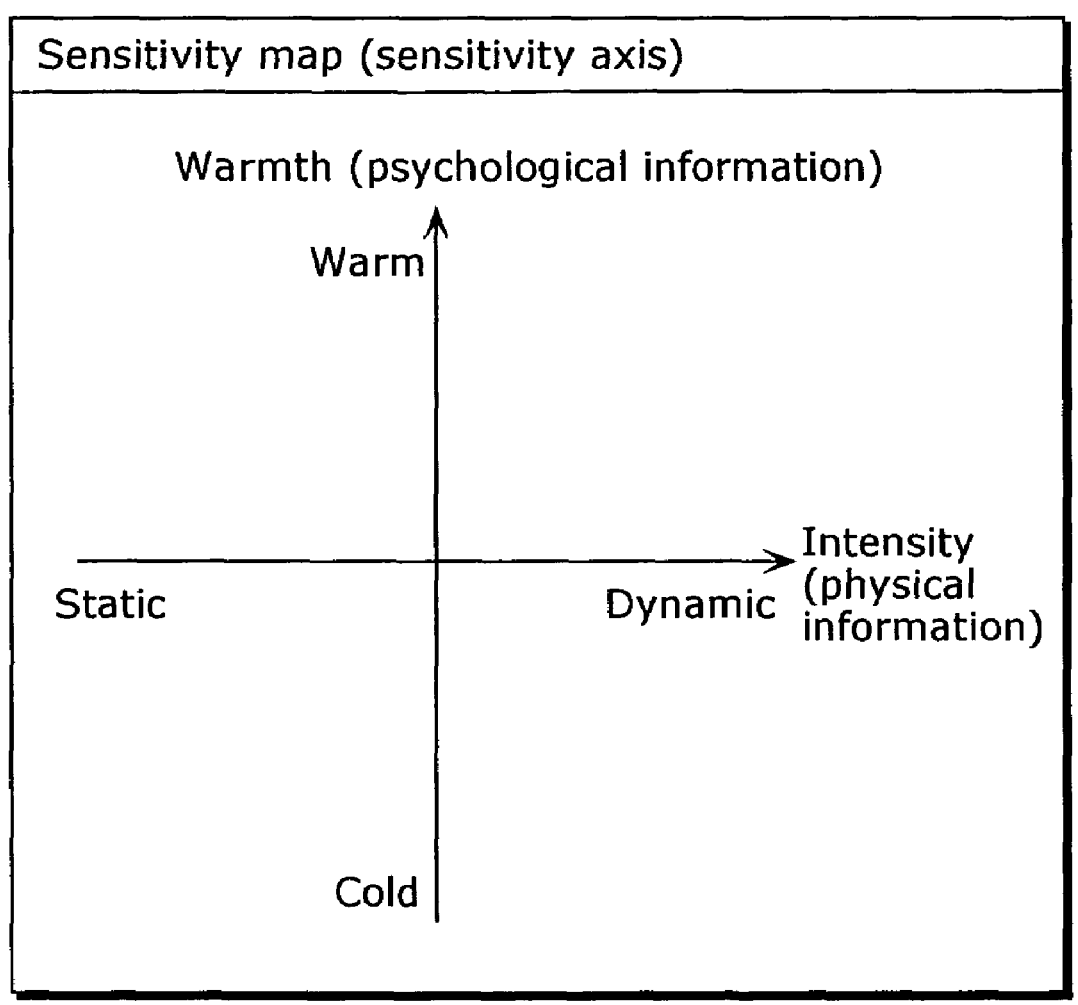
FIG. 5 is an example of a sensitivity map displayed in the still image producing apparatus according to the first embodiment.

FIG. 5 is an example showing a sensitivity map displayed in the still image producing apparatus 100 according to the first embodiment.

As the definition of the axes which enable the music data and the image data to be used in the same map, intensity and warmth are used here. The X axis is the axis of the "intensity" in which the right side indicates "dynamic" and the left side indicates "static". The Y axis is the axis of the "warmth" in which the upper side indicates "warm" and the lower side indicates "cold". Each axis is quantified, and the absolute value of the number indicates the degree.

Then, in the mapping process unit 109, the feature extracted from the image feature extraction unit 102 and the music feature extraction unit 106 are associated with the above mentioned sensitivity map, so as to generate a sensitivity map in which the image data and the music data are arranged.

FIG. 6 is a diagram showing the relation between the image sensitivity map and the music sensitivity map displayed in the still image producing apparatus 100 according to the first embodiment.

As described above, according to the present invention, the same axes are employed for the image and the music. In other words, the axes which can share the same map are examined. Thus, associations between the maps become clear. In reproducing a slide show, if a user only selects an area of one of the image or the music via the menu input unit 111, the associated music data and image data which exist in the proximity of the selected area are preferentially produced.

Figure 7:
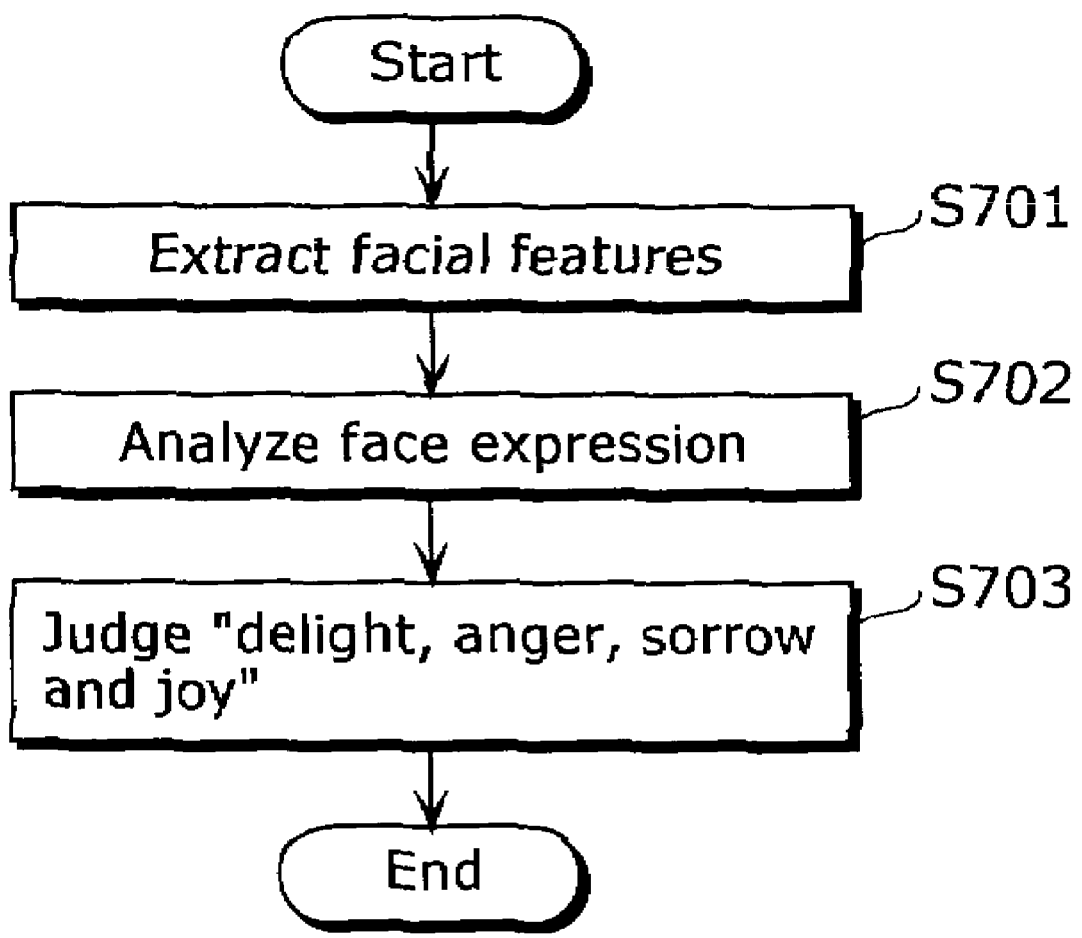
FIG. 7 is a flow chart showing operational procedures of the still image producing apparatus according to the first embodiment in the case where a human countenance is specified in an image feature extraction unit.

FIG. 7 is a flow chart showing operational procedures of the still image producing apparatus 100 according to the first embodiment in the case where a human countenance in the image feature extraction unit 102 is specified.

In the case where the main subject of the image is a person, emotions are judged from the face expression in the image feature extraction unit 102.

First, the image feature extraction unit 102 extracts features of the face (S701). Then, the face expression is analyzed (S702). Finally, the mapping process unit 109 estimates "delight, anger, sorrow and joy" (S703). For example, by specifying a plurality of features from the eyes or ears, and using the feature data, in the case where it is judged that the eyes and eyebrows lower from the inner side to the outer side, and the mouth is closed with both ends turned down, "sorrow" is estimated. In the case where the eyes and eyebrows are horizontal, the eyes are slightly wide-open with the teeth seen, and creases are around the mouth, "delight" is estimated.

Figure 8A:
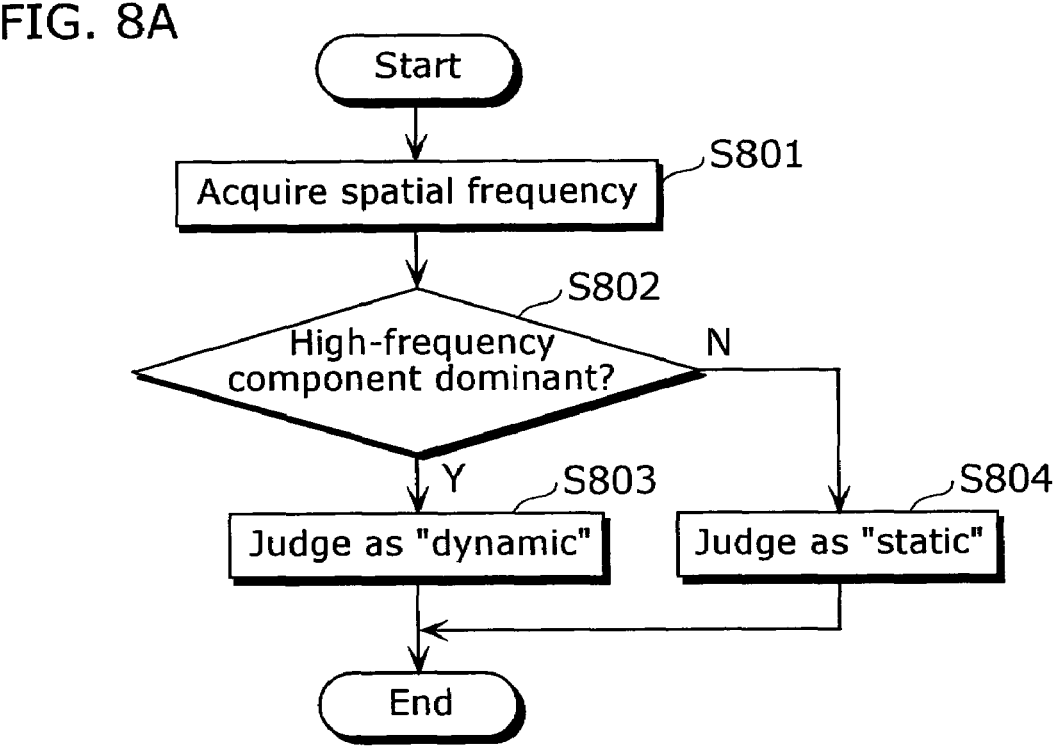
FIG. 8A and FIG. 8B respectively show an example of procedures for extracting physical information in an image feature extraction unit of the still image producing apparatus according to the first embodiment.
Figure 8B:
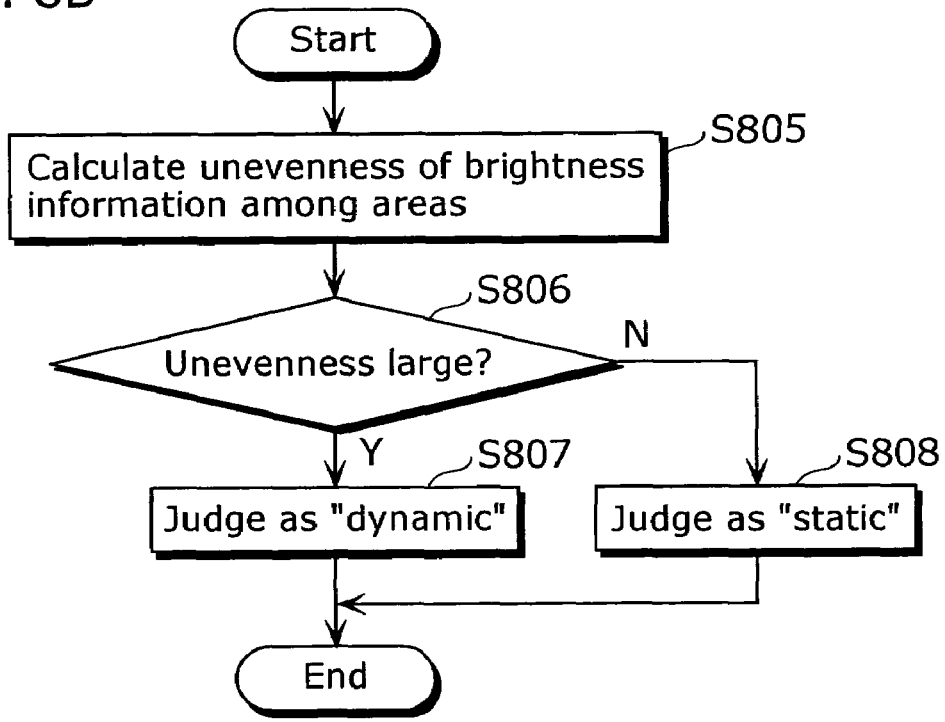

FIG. 8A and FIG. 8B respectively show an example of procedures for extracting physical information in the image feature extraction unit 102 of the still image producing apparatus 100 according to the first embodiment.

First, the image feature extraction unit 102 computes the two-dimensional Fourier transform for brightness of each pixel in an image, so as to acquire spatial frequency information (S801).

Next, the mapping process unit 109 judges whether or not high-frequency component is dominant (S802). In the case where it is judged that the high-frequency component is dominant (Y in S802), it is judged that the more dominant the high-frequency component is, the more "dynamic" the image data is (S803). On the other hand, in the case where it is judged that the high-frequency component is not dominant (N in S802), it is judged as "static" (S804), and the judgment is arranged on the sensitivity map.

FIG. 8B shows procedures in the case where the image feature extraction unit 102 uses brightness information as physical information.

First, the image feature extraction unit 102 divides the original image into a plurality of areas, so as to calculate unevenness of brightness among the areas (S805). Then, the mapping process unit 109 judges whether or not the unevenness is large (S806). In the case where it is judged that the unevenness is large (Y in S806), the image is judged as "dynamic" (S807). On the other hand, in the case where it is judged that the unevenness is not large (N in S806), the image is judged as "static" (S808), and the image data is arranged on the sensitivity map. Here, the physical feature extracted in the image feature extraction unit 102 is not limited to the above mentioned spatial frequency or brightness information, and various kinds of information such as autocorrelation are conceivable.

Figure 9:
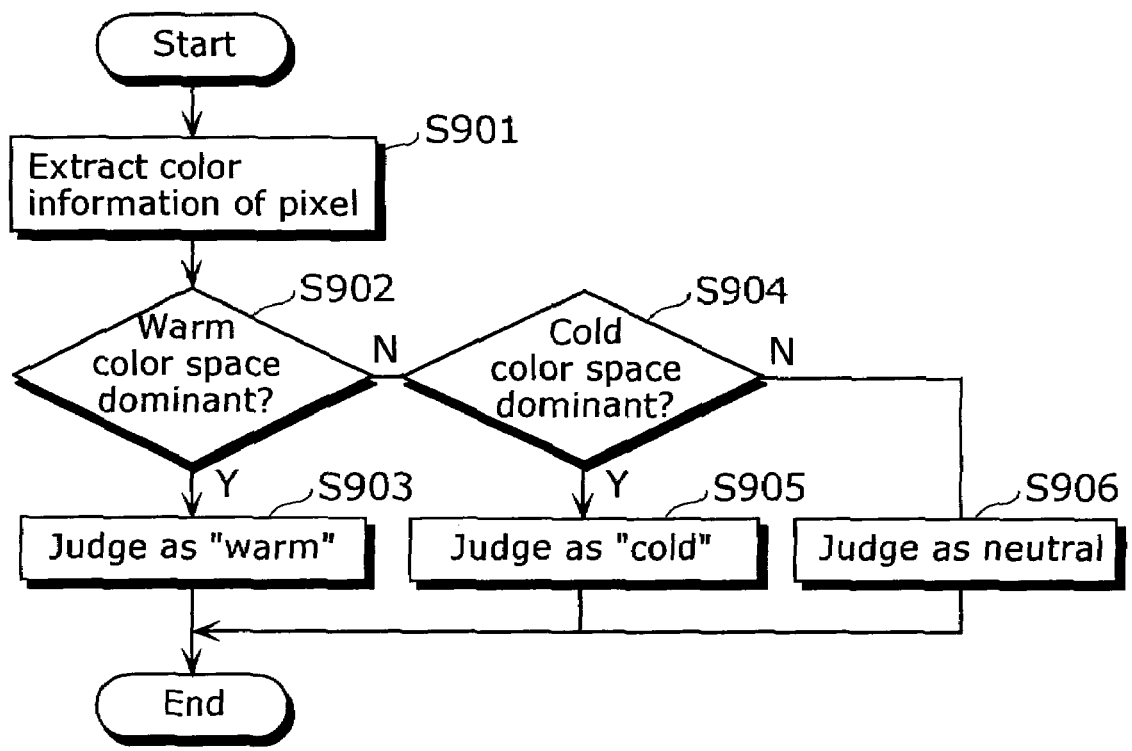
FIG. 9 is an example showing procedures for extracting psychological information which exists in Y axis direction of an image feature extraction unit in the still image producing apparatus according to the first embodiment.

FIG. 9 is an example showing procedures for extracting psychological information which exists in the Y axis direction of the image feature extraction unit 102 of the still image producing apparatus 100 according to the first embodiment.

First, the image feature extraction unit 102 extracts color information of a pixel (S901). There are different kinds of color spaces. For example, the Lab color space may be used.

The mapping process unit 109 judges whether or not the warm color space such as red is dominant (S902). In the case where the warm color space is dominant (Y in S902), the image is judged as "warm" (S903). In the case where the warm color is not dominant (N in S902), it is judged whether or not the cold color space such as blue is dominant (S904). In such case as described above, if the cold color space is dominant (Y in S904), the image is judged as "cold" (S905). On the other hand, in the case where it is judged that the cold color space is not dominant (N in S904), the image is judged as "neutral" (S906), which is arranged on the sensitivity map.

In all of the cases from the above mentioned FIG. 7 to FIG. 9, the brightness can be improved if the mapping process unit 109 previously analyzes the layout structure of the image, and extracts a representative area, so as to mainly use the feature of the representative area. Moreover, the judgment can be made based on the information of both the representative area and the background area. The layout analysis can be performed by, for example, referring to the distribution of the color and brightness information within the image area.

Figure 10:
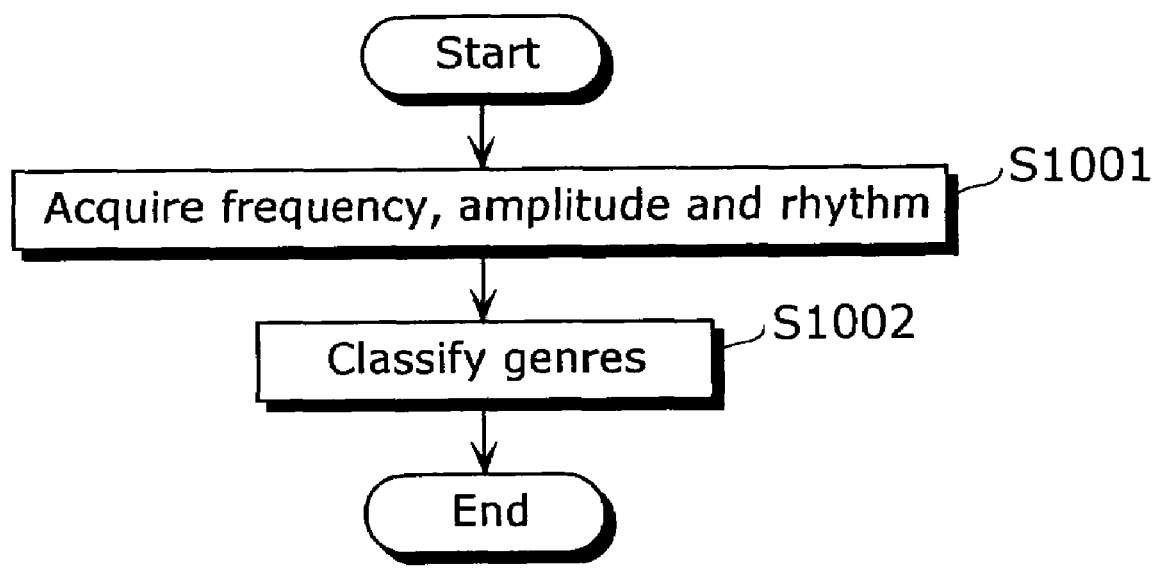
FIG. 10 is a flow chart showing procedures for extracting feature quantity in a music feature extraction unit of the still image producing apparatus according to the first embodiment.

FIG. 10 is a flow chart showing the procedures for extracting the feature in the music feature extraction unit 106, according to the still image producing apparatus 100 of the first embodiment.

First, the music feature extraction unit 106 extracts, from music data, information such as frequency, amplitude and rhythm (S1001). Then, the mapping process unit 109, using the above mentioned information, classifies the kinds of the music data into different genres such as "Pops", "Rock", "Singing" and "Traditional ballad" (S1002), so as to arrange the classified genres on the music map.

Figure 11A:
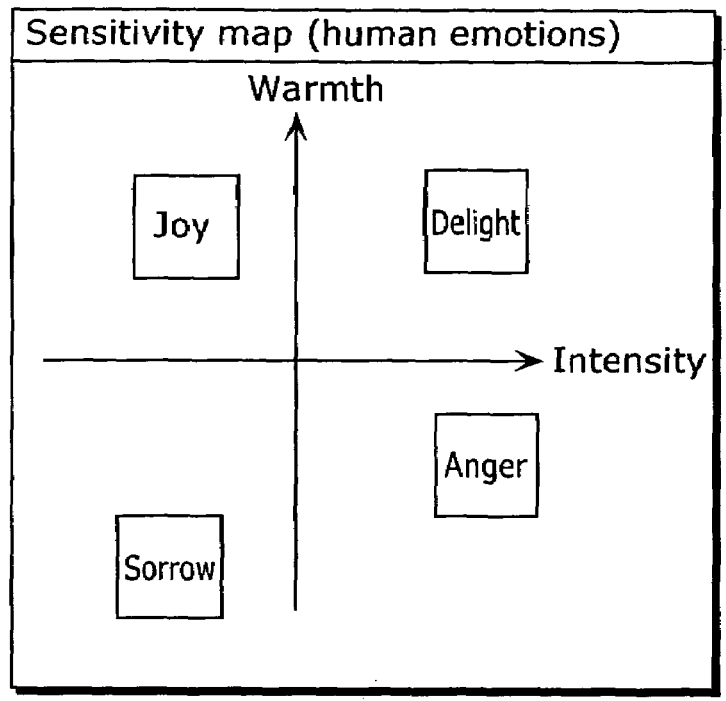
FIG. 11A and FIG. 11B respectively show an example of a sensitivity map displayed in a screen of the still image producing apparatus according to the first embodiment.

FIG. 11A shows a mapping image 1100 in the case where each image is mapped using human countenance as emotions. Here, as the human countenance, "delight, anger, sorrow and joy" are used, and an example of each quadrant is shown in FIG. 11A as follows.

The first quadrant: dynamic and warm indicating "delight"
The second quadrant: static and warm indicating "joy"
The third quadrant: static and cold indicating "sorrow"
The fourth quadrant: dynamic and cold indicating "anger"

If the user selects the first quadrant of "delight" via the menu input unit 111, the slide show using the image data of the first quadrant whose feature is judged as "dynamic and warm" thus indicating "delight". At the same time, the music which is judged as the first quadrant on the music map is automatically played back. For example, a delighted face expression for a portrait, a dynamic landscape picture and joyful pop music are automatically selected and played back.

Figure 11B:
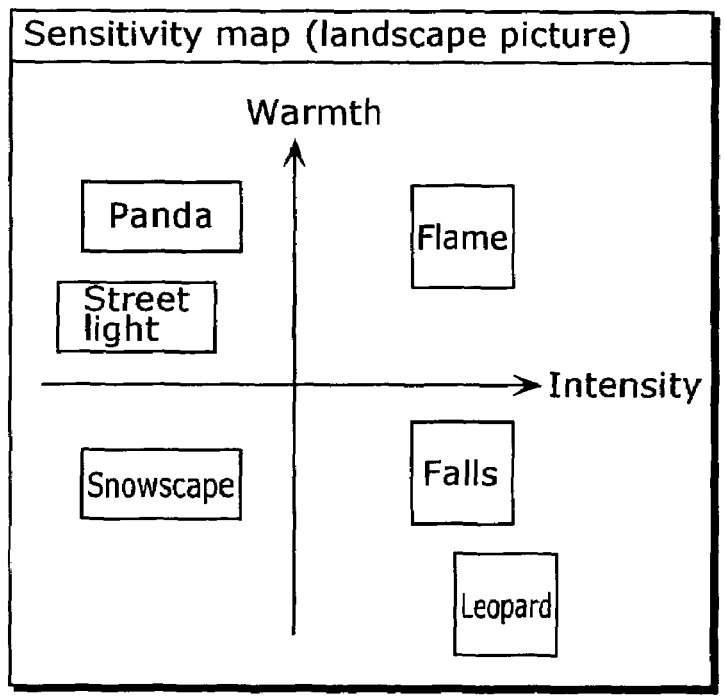

In FIG. 11B a landscape picture is used as sensitivity. In the landscape picture, feature is extracted using physical information and psychological information, and the extracted feature is arranged on the sensitivity map by the mapping process unit 109.

Here, regarding the image sensitivity, a picture example of each quadrant is shown in FIG. 11B as follows.

The first quadrant: dynamic and warm indicating "flame"
The second quadrant: static and warm indicating "panda" and "street light"
The third quadrant: static and cold indicating "snowscape"
The fourth quadrant: dynamic and cold indicating "falls" and "leopard"

Such decisions are made by the mapping process unit 109 using the above mentioned spatial frequency, brightness information and color information. For example, "flame" and "fire" have high temperatures, and "falls" has a fast movement. On the other hand, the Y axis is mainly attributed to psychological information, thereby is not relevant to the actual temperature in some cases. For example, regarding the image sensitivity, "panda" has a warm impression, and "leopard" has a cold impression. However, both of the animals are mammals which have body temperatures.

Figure 12:
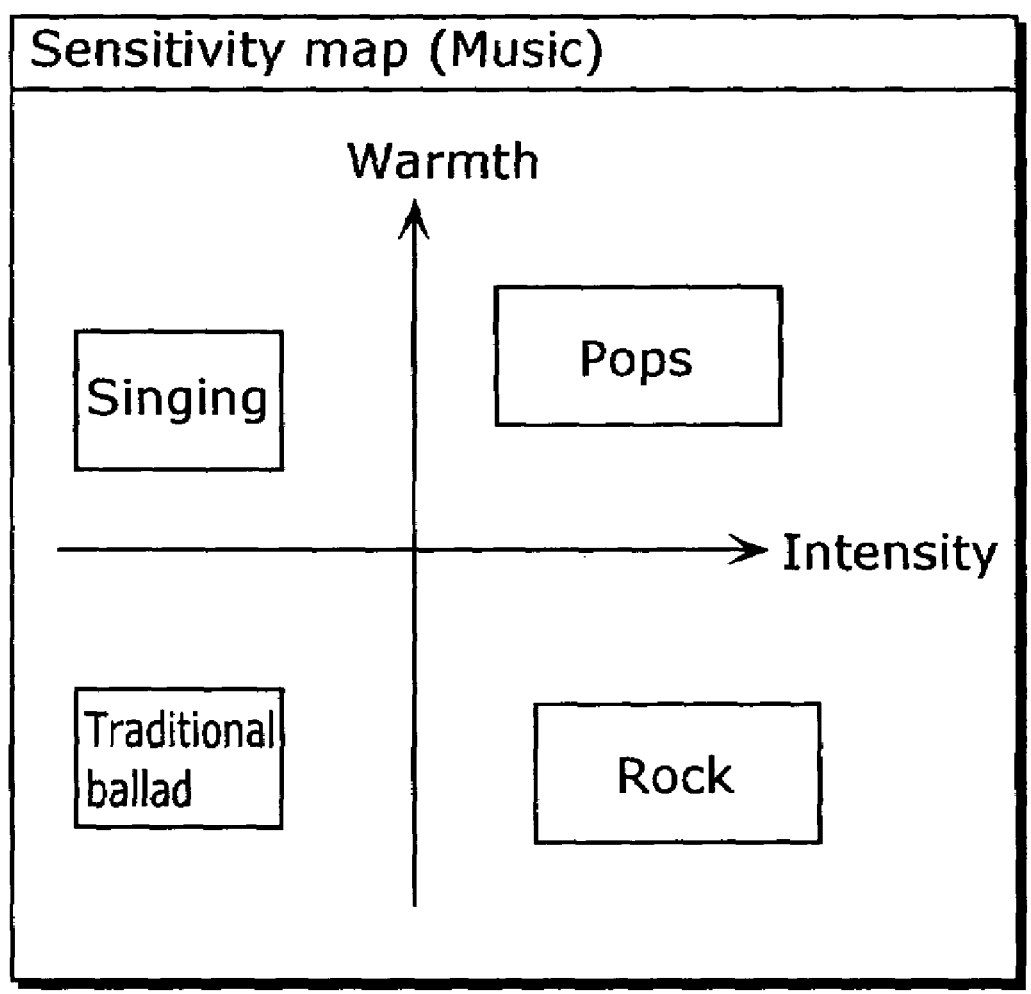
FIG. 12 shows an example of a sensitivity map using a music feature quantity displayed in a screen of the still image producing apparatus according to the first embodiment.

FIG. 12 is an example showing a sensitivity map which uses a music feature quantity displayed in the screen of the still image producing apparatus 100 according to the first embodiment.

Regarding the music sensitivity, the genre of each quadrant is as follows.

The first quadrant: dynamic and warm indicating "Pops"
The second quadrant: static and warm indicating "singing"
The third quadrant: static and cold indicating "traditional ballad"
The fourth quadrant: dynamic and cold indicating "Rock"

The music sensitivity map is particularly useful for a car navigator in the case where a slide show is viewed after music is selected.

In addition, according to the still image producing apparatus 100 of the present invention, the following methods are conceivable in order to reinforce the image display.

(i) The images are displayed in the order of the score associated with the quantified axis, and gradually accelerated. For example, in the case where "thirst" is selected on the sensitivity map, using the score information, the portraits are consecutively displayed in such order as changing from a normal face expression to an angry face expression.

(ii) Visual effects are changed according to the score. For example, an image with a low score is intensely moved, so as to present a movement. An image with a high score is slowly zoomed in, so as to thoroughly display the image per se.

(iii) Images with high scores and images with low scores are mixed, so as to add variety to the display. Also, images which exist far from one another on the map are sometimes displayed, so as to make the display unpredictable.

Moreover, according to the still image producing apparatus 100 of the present invention, it is useful to modify the image. For example, in the case where "sorrow" is selected on the sensitivity map, in the slide show generation unit 110, the human countenance in the image is changed to a crying face, or the color tone of the landscape picture is changed to the sunset color. Regarding the music as well, the melody is changed to the minor scale, so as to reflect the selected mood.

As described above, the still image producing apparatus 100 according to the present invention comprises: the image feature extraction unit 102 which extracts the feature of the physical information and the psychological information from the image data; the music feature extraction unit 106 which extracts the feature of the physical information and the psychological information from the music data; and the mapping process unit 109 which maps, using the above mentioned feature, the music data and the image data on the sensitivity maps of the coaxial system.

Thus, if the user selects, from the sensitivity map, via the menu input unit 111, one of the image information and the music information desired to be produced as the slide show, according to the feeling and mood of that time, the production and display of the slide show in which music and images are harmonized can be automatically realized. Therefore, entertaining features for the user can be improved.

Also, based on the score information which is the quantified feature on the sensitivity map, the visual effects and the image modification process can be performed in the slide show generation unit 110. Thereby, the slide show featuring improved entertainment can be produced.

Aside from the sensitivity map used in the explanation of the first embodiment, different axes may be employed respectively for emotions, image sensitivity and music sensitivity, so as to be associated with one another among the maps. Also, the axes used on the sensitivity map are not necessarily attributed to the physical information and psychological information as described in the first embodiment. The terms such as "delight" used on the sensitivity map are not limited to the above mentioned examples. In addition, the mapping described in the first embodiment is simply an example. For example, on the music sensitivity map, some pop songs may belong to the static and warm area. Moreover, since there is individual difference in the musical interpretation, the location of the music data on the sensitivity map may not correspond with individual sensitivity. Thus, although the mapping process in the mapping process unit 109 needs some individual customization, the essence of the present invention should not be damaged.

The extraction of the feature in the image feature extraction unit 102 and the music feature extraction unit 106 is not limited to the time of the register. For example, after the data is stored in the music storing unit 108 and the image storing unit 104, utilizing the time when the slide show generation unit 110 is pausing, the feature may be extracted in the background. In the case where the processing speed of the still image producing apparatus 100 is fast enough, the feature may be extracted in time of the selection. Needless to say, the mapping of the image data and the music data is not limited to the automatic extraction, and the user can manually register the data on the map.

Furthermore, the image data and the music data may be downloaded via network. In such case as described above, the feature parameter information may be added to the downloaded music data and image data per se.

Second Embodiment

Next, the second embodiment of the still image producing apparatus 100 according to the present invention will be explained.

According to the second embodiment, aside from the sensitivity map which uses the image and music according to the first embodiment as described above, the sensitivity map whose style is predetermined is generated. The style according to the second embodiment determines the mood of the whole slide show such as "exciting" and "relaxing".

Also, the functional blocks of the still image producing apparatus 100 according to the second embodiment are the same as the first embodiment, and the explanation will be omitted here.

Figure 13:
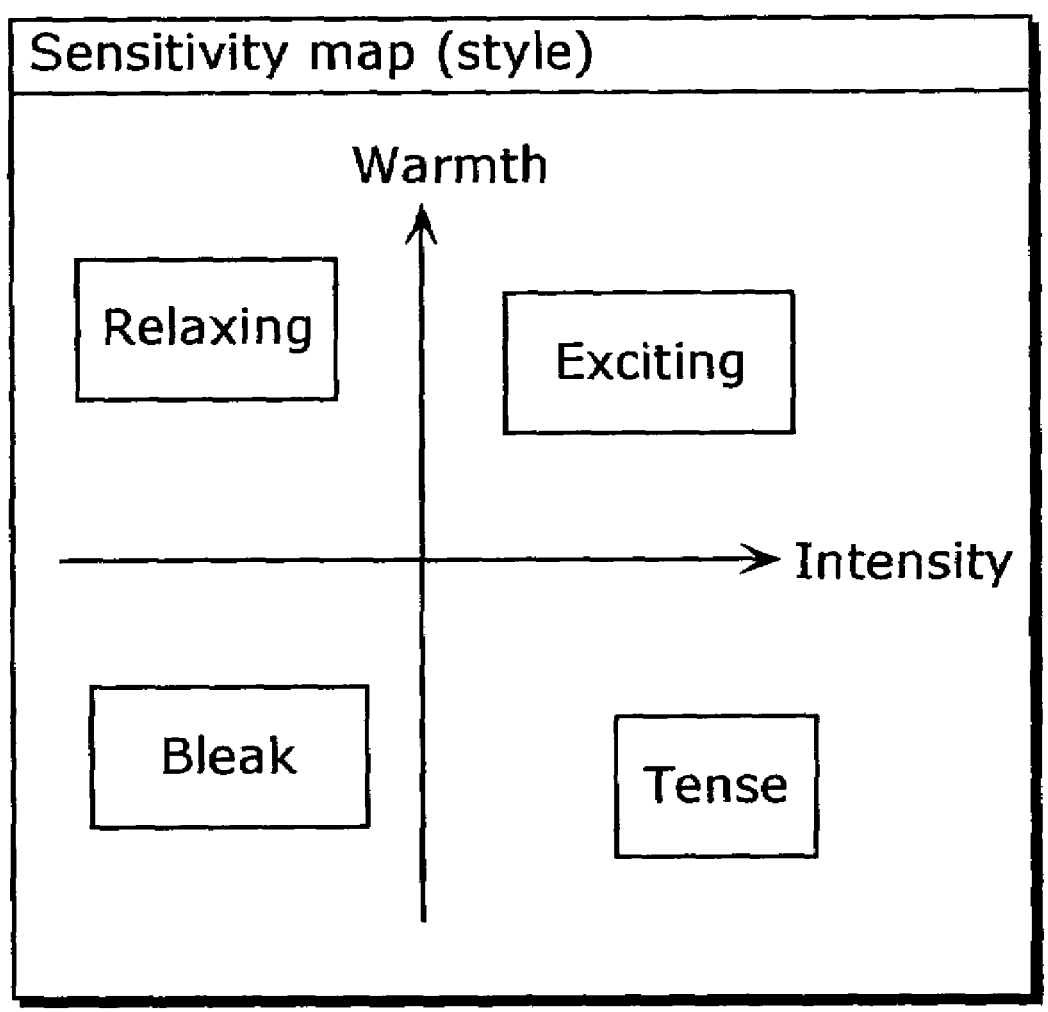
FIG. 13 is an example of a mapping diagram using styles employed in a mapping process unit of the still image producing apparatus according to the second embodiment.

FIG. 13 is an example of the mapping diagram which uses the styles employed in the mapping process unit 109 of the still image producing apparatus 100 according to the second embodiment. The mapping process unit 109 predetermines the style associated with each quadrant as follows.

The first quadrant: dynamic and warm indicating "exciting"

The second quadrant: static and warm indicating "relaxing"

The third quadrant: static and cold indicating "bleak"

The fourth quadrant: dynamic and cold indicating "tense"

Figure 14:
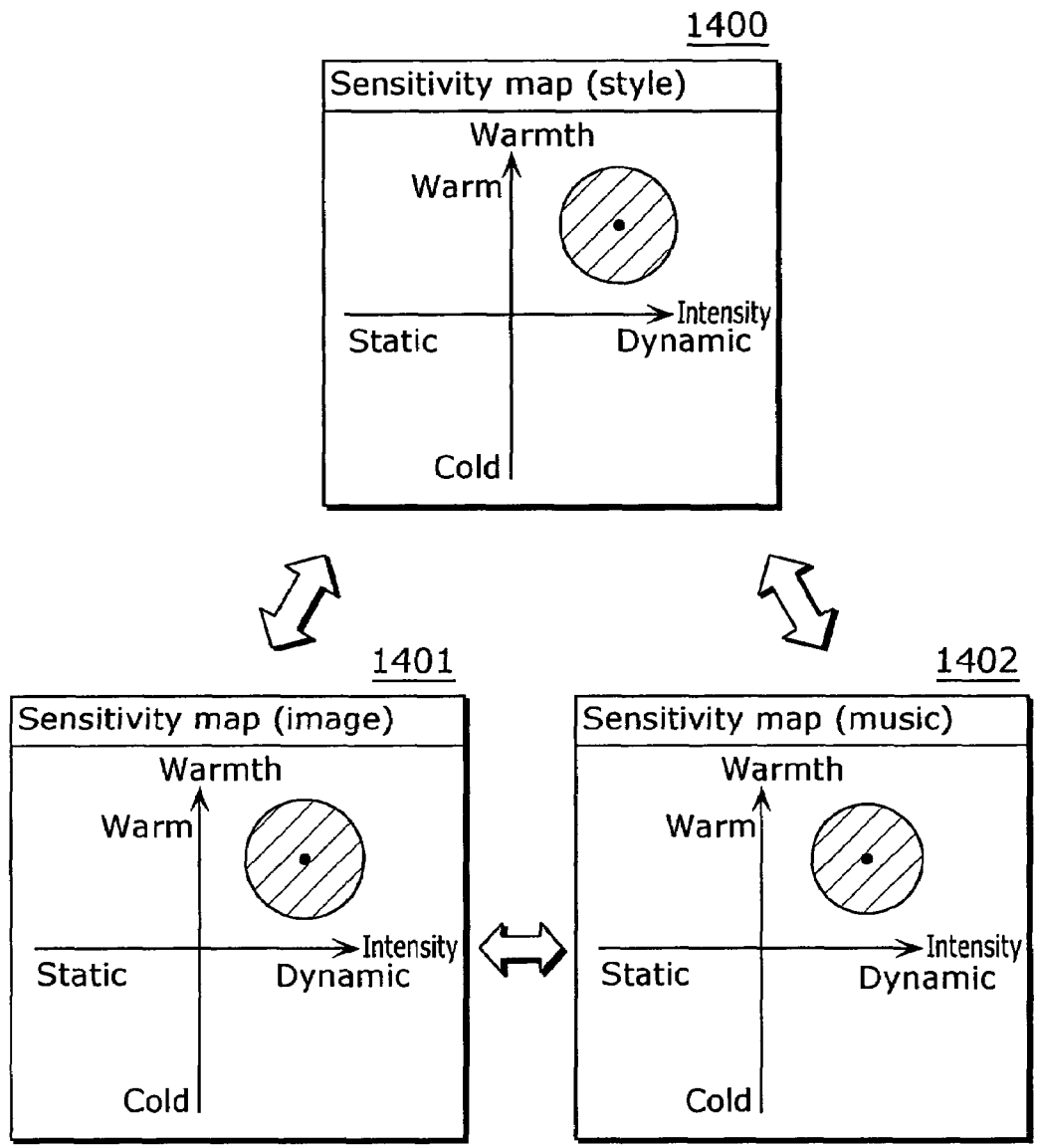
FIG. 14 is a diagram showing the relations among sensitivity maps displayed in the still image producing apparatus according to the second embodiment.

FIG. 14 is a diagram showing the relations among the sensitivity maps displayed in the still image producing apparatus 100 according to the second embodiment. The sensitivity maps employ the coaxial system among image, music and style. Therefore, the associations among the maps become clear. In reproducing a slide show, if a user selects a style via the menu input unit 111, the music data and the image data associated with the style can be preferentially produced.

FIG. 15 is an example showing an album screen which is one of the screen types of the still image producing apparatus 100 according to the second embodiment.

In some cases, when starting a slide show, a user selects an album desired to be produced. In the album screen as shown in FIG. 15, the details of the album registered by the user are classified by items, and displayed. For example, as albums, "domestic travel (Kyushu)", "overseas travel (the U.S.)", "sports festival" and "party" are distinguished.

If the user only selects the album desired to be produced as the slide show from the album screen via the menu input unit 111, images and music are automatically played back. For example, in the case where the slide show using the "travel" album is selected, (i) when a seaside picture is displayed, music harmonized with the sea is automatically selected, and (ii) when a picture of the dinner party during the travel is displayed, music harmonized with the party is automatically produced.

In a car navigator, music can be selected first, and a slide show associated with the music can be produced. In such case as described above, it is conceivable that (i) the recorded list of music is displayed, (ii) the user selects the music desired to be played back via the menu input unit 111, and (iii) the slide show is produced along with the mood of the selected music.

Figure 16:
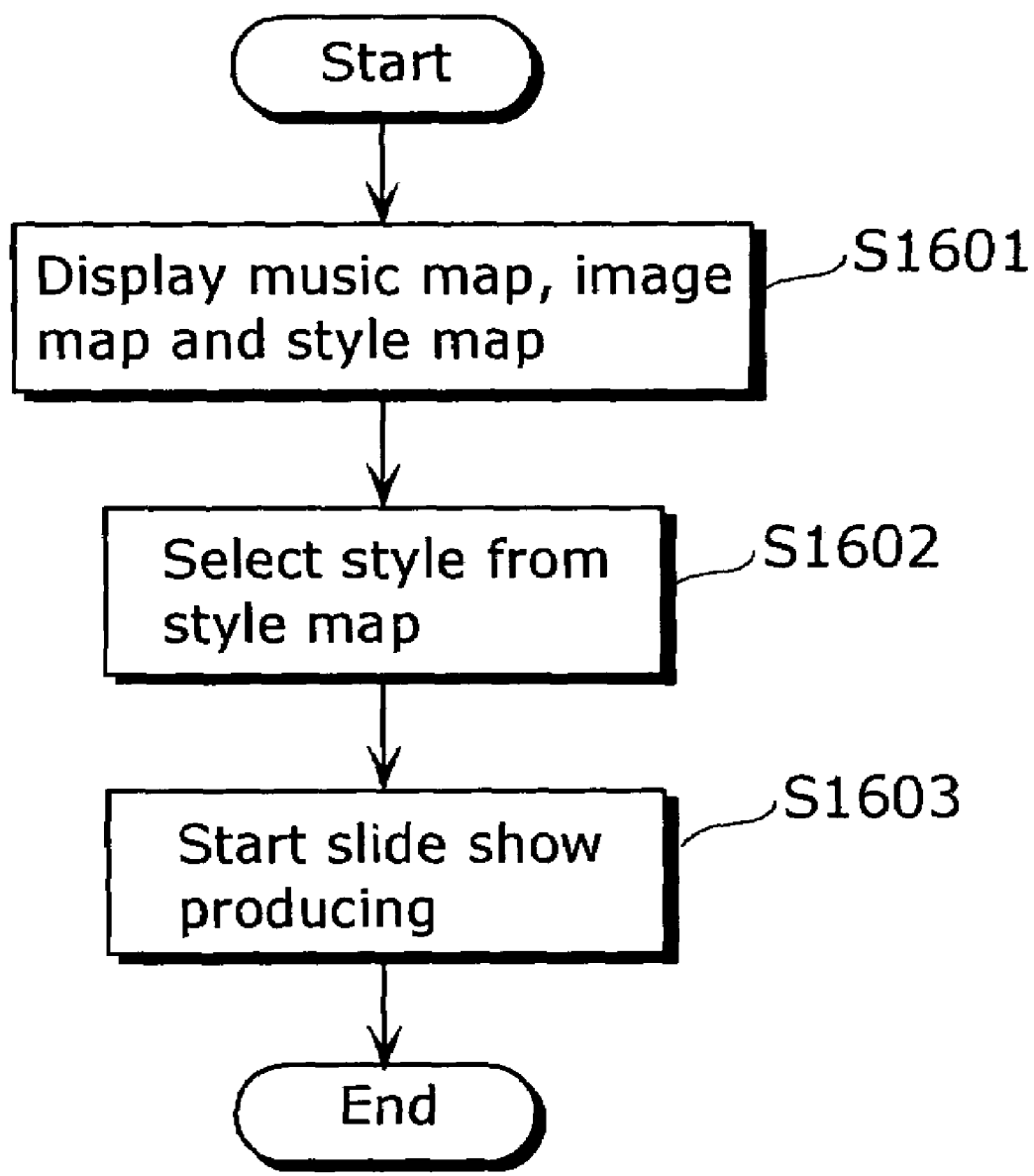
FIG. 16 is a flow chart showing a user's procedures on the still image producing apparatus according to the second embodiment.

FIG. 16 is a flow chart showing a user's procedures on the still image producing apparatus 100 according to the second embodiment.

First, the user selects a menu screen via the menu input unit 111 (S1601). According to the second embodiment, a style is selected as the menu screen.

Next, the user selects, on the map, via the menu input unit 111, the location of the style where the slide show is started (S1602).

Then, the slide show generation unit 110 generates the slide show according to the specification from the menu input unit 111, and outputs the slide show from the display unit 112 (S1603). For example, if the selected style is "exciting", the images and music of the first quadrant are preferentially selected, so as to present a dramatic movement. If the selected style is "relaxing", the images and music of the second quadrant are preferentially selected, so as to present a soft movement. Thus, the images associated with the mood of the style are produced.

As described above, according to the still image producing apparatus 100 of the second embodiment, the mapping process unit 109 generates the sensitivity map whose style is predetermined, using the sensitivity maps which employ the coaxial system between the image and music.

Thus, if the user selects the style such as "exciting" via the menu input unit 111, the slide show generation unit 110 automatically produces the slide show using the images and music associated with the style. Thereby, the slide show associated with the mood can be produced.

In order to reinforce the image display, as well as the above mentioned first embodiment, it is conceivable to provide visual effects according to the score. Also, in addition to selecting the images associated with the style, as well as the first embodiment, it is useful to modify the images. For example, in the case where the style indicates "bleak", in the slide show generation unit 110, the human countenance in the image may be changed to a crying face, or the color tone of the landscape picture may be changed to the sunset color. Regarding the music as well, the melody can be changed to the minor scale, so as to reflect the style.

Third Embodiment

Next, the still image reproducing system according to the third embodiment of the present invention will be explained. According to the third embodiment, the still image reproducing system comprises a transmission apparatus and a reception apparatus. The transmission apparatus includes a transmission unit which transmits image data including feature to the reception apparatus. And, the reception apparatus reads out the feature, and acquires image abstraction according to the user's request, so as to display the acquired image.

The still image reproducing system according to the third embodiment is generally a TV telephone and the like which transmit images along with speech. The speech is transmitted in the same way as a regular telephone, thus the specific explanation will be omitted here.

Figure 17:
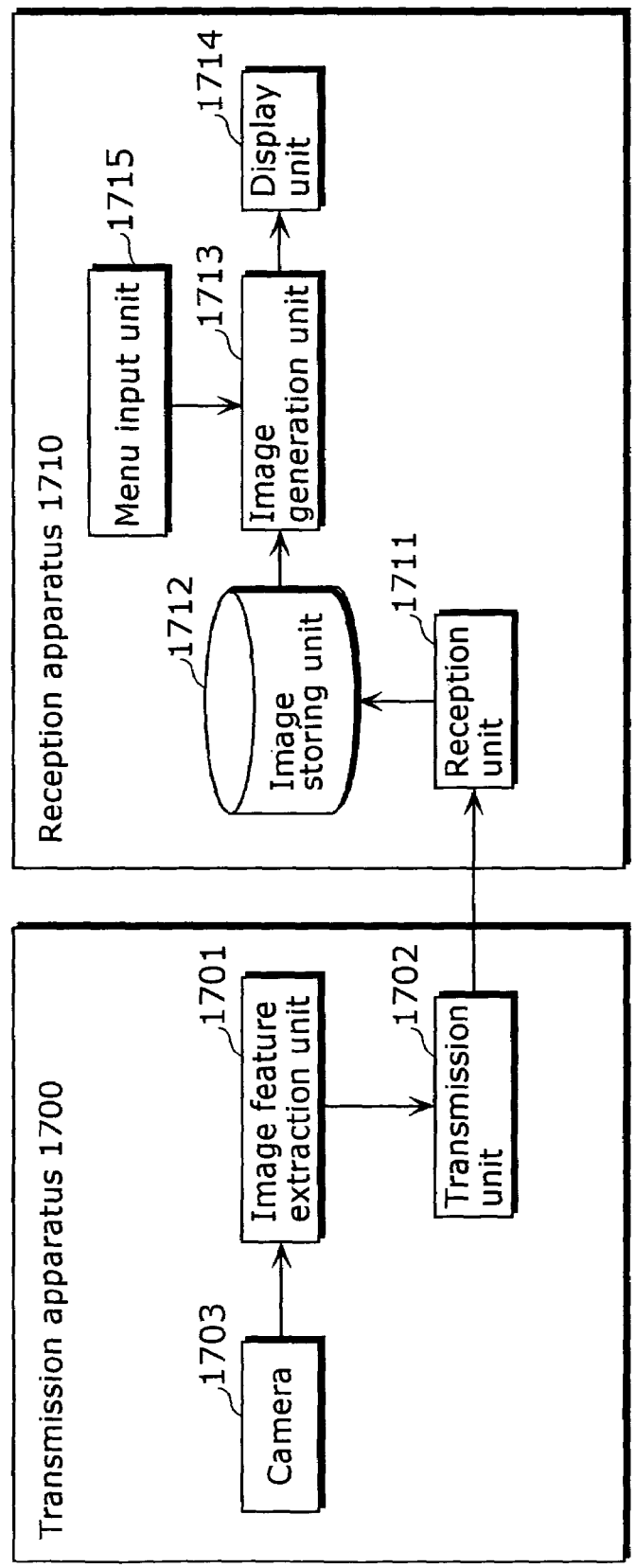
FIG. 17 is a structure diagram showing functional blocks of the transmission apparatus and reception apparatus according to the third embodiment.
Figure 18:
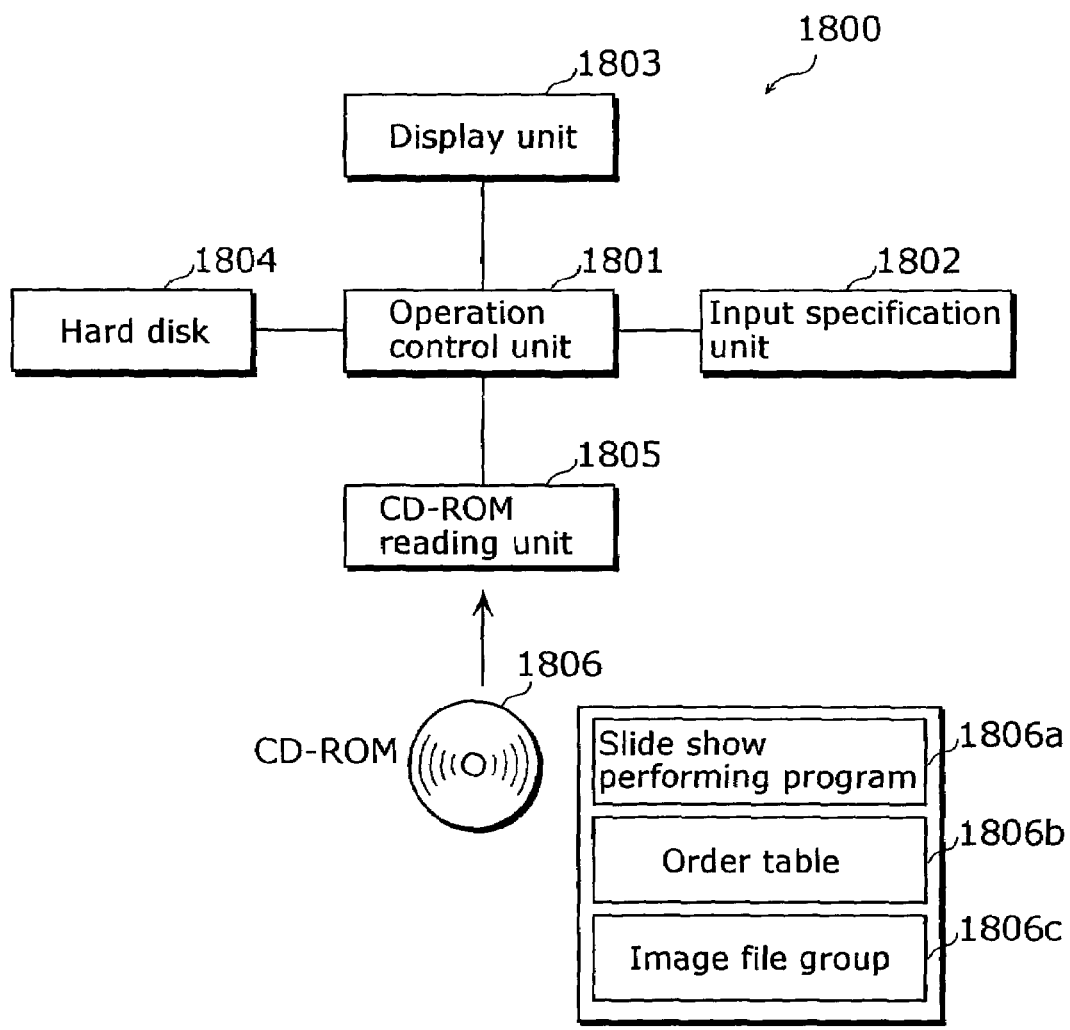
FIG. 18 is a structure diagram of the conventional slide show apparatus described in the Laid-Open Japanese Patent application No. 2001-103415.

FIG. 17 is a structure diagram showing functional blocks of a transmission apparatus 1700 and a reception apparatus 1710 according to the third embodiment.

The transmission apparatus 1700 includes at least: a camera 1703; an image feature extraction unit 1701; and a transmission unit 1702.

The camera 1703 photographs a face expression of the speaker. The image feature extraction unit 1701 extracts images, for example, per second, so as to extract, from the images, the feature of the physical information and the psychological information. The transmission unit 1702 transmits, to the reception apparatus 1710, via network such as a telephone line, the feature extracted in the image feature extraction unit 1701, along with the image data.

On the other hand, the reception apparatus 1710 includes: a reception unit 1711; an image storing unit 1712; an image generation unit 1713; a display unit 1714; and a menu input unit 1715.

The reception unit 1711 receives information transmitted from the transmission unit 1702 of the transmission apparatus 1700. The image storing unit 1712 is a hard disk and the like which record the image data received in the reception unit 1711. The image generation unit 1713 (i) extracts feature from the image data, and (ii) selects images associated with the user's selection, so as to generate the images to be displayed in the display unit 1714. The display unit 1714 displays the images generated in the image generation unit 1713. The menu input unit 1715 receives menu selection from the user via a remote control and the like.

Next, the procedures for transmitting images in the still image reproducing system according to the third embodiment will be explained. Here, the communication from the transmission apparatus 1700 to the reception apparatus 1710 is explained. However, the transmission apparatus 1700 and the reception apparatus 1710 may be integrated, and the bidirectional communication such as full-duplex transmission may be performed.

In the transmission apparatus 1700, (i) the camera 1703 captures the transmitter's face expression, (ii) the image feature extraction unit 1701 estimates emotions based on the face expression, and (iii) the transmission unit 1702 transmits the emotional information.

In the reception apparatus 1710, the reception unit 1711 receives the emotional information, and transmits the emotional information to the image generation unit 1713. The image generation unit 1713 selects the transmitter's images from the image storing unit 1712, so as to (i) select and display the pictures associated with the emotion or (ii) changes the face expression according to the emotion, and display the changed image in the display unit 1714. The data stored in the image storing unit 1712 may be transmitted by the transmitter, or set by the receiver.

Also, the picture displayed in the display unit 1714 needs not be the picture of the transmitter, but other related pictures according to the mood. For example, the pictures of the transmitter's family, persons involved, favorite celebrities, CG characters and the like are conceivable. In addition, not only the person's pictures but also the landscape pictures may be used. For example, a picture of volcanic eruption may be displayed for a scene of anger. A picture of a babbling stream may be displayed for a refreshing scene. Thus, the pictures having the sensitivity associated with the transmitter's emotions are displayed. As well as the person's pictures, the pictures may be changed and displayed. Also, the pictures may be switched during the conversation, so as to produce the slide show as explained in the first embodiment.

The following methods are conceivable in order to improve the display effects.

The first method is to change the display according to the communication history. For example, when the incoming interval is long, the display may be changed to the angry face expression in the image generation unit 1713. When the receiving number reaches a default value (for example, one hundred times), a delighted face expression may be displayed. Another conceivable method is to change the screen in time of reception and communication. For example, an emotionless face expression of the transmitter may be displayed while calling, and the display may be changed to a delighted face expression at dial-up.

As described above, according to the transmission apparatus 1700 and the reception apparatus 1710 of the third embodiment, unlike the conventional TV telephone which directly transmits a face expression as it is, the image displayed on the side of the reception apparatus 1710 is made abstract, according to the user's preference, for example, by consecutively switching the images during the conversation. Therefore, privacy protection and communication with gentle emotional display can be realized.

The emotional estimation on the side of the transmission apparatus 1700 is not limited to the face expression, but vital signs such as voice, pulse and blood pressure may be used for the emotional estimation. The accuracy of the emotional estimation can be improved by combining various kinds of information.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The still image producing apparatus according to the present invention can be used as a digital camera, a cellular phone, a car navigator, a DVD recorder, a Personal Digital Assistance (PDA) and the like which have a still image reproducing function. Also, the program according to the present invention is useful as browsing software for digital pictures on a Personal Computer (PC).

What is claimed is:

1. A still image producing apparatus which produces a slide show using image data and music data, the apparatus comprising:
   a music feature extraction unit operable to extract a music feature quantity from each of a plurality of music data;
   an image feature extraction unit operable to extract an image feature quantity from each of a plurality of image data;
   a mapping process unit operable to map the plurality of music data and the plurality of image data on a two-dimensional map using the music feature quantity extracted from each of the plurality of music data and the image feature quantity extracted from each of the plurality of image data;
   a reception unit operable to receive, from a user, a selection of a location on the two-dimensional map, and a request for a production of the slide show; and
   a production unit operable to play back at least a portion of the plurality of music data and at least a portion of the plurality of image data mapped by said mapping process unit,
   wherein the two-dimensional map includes two axes, in which physical information is arranged in a first axis direction and psychological information is arranged in a second axis direction,
   said image feature extraction unit is operable to extract, for each of the plurality of image data, the image feature quantity including first physical information and first psychological information,
   said music feature extraction unit is operable to extract, for each of the plurality of music data, the music feature quantity including second physical information and second psychological information,
   said mapping process unit is operable to map, on the two-dimensional map defined by the two axes, the plurality of image data based on the first physical information and the first psychological information, and the plurality of music data based on the second physical information and the second psychological information, and
   said production unit is operable to generate the slide show using, from among the plurality of image data and the plurality of music data mapped on the two-dimensional map, image data and music data which are mapped on the location received by said reception unit.

2. The still image producing apparatus according to claim 1,
   wherein in said mapping process unit, a coordinate system in which the plurality of image data is mapped and a coordinate system in which the plurality of music data is mapped indicate the same feature quantity.

3. The still image producing apparatus according to claim 2,
   wherein the map is divided into four quadrants by the two axes, and
   wherein the music data and the image data which are used to generate the slide show are located in the same quadrant on the two-dimensional map.

4. The still image producing apparatus according to claim 1,
   wherein the physical information is spatial frequency,
   wherein, for each of the plurality of image data, in the case where high-frequency component of the spatial frequency is dominant, said mapping process unit judges the physical information as a dynamic tendency, and maps the image data on the two-dimensional map in accordance with the judged dynamic tendency, and
   wherein, for each of the plurality of image data, in the case where high-frequency component of the spatial frequency is not dominant, said mapping process unit judges the physical information as a static tendency, and maps the image data on the two-dimensional map in accordance with the judged static tendency.

5. The still image producing apparatus according to claim 1,
   wherein the physical information is brightness information,
   wherein, for each of the plurality of image data, in the case where there is large unevenness in the brightness information, said mapping process unit judges the physical information as a dynamic tendency, and maps the image data in accordance with the judged dynamic tendency, and
   wherein for each of the plurality of image data, in the case where there is little unevenness in the brightness information, said mapping process unit judges the physical information as a static tendency, and maps the image data in accordance with the judged static tendency.

6. The still image producing apparatus according to claim 1,
   wherein the physical information is sound wavelength, amplitude and rhythm, and wherein for each of the plurality of music data, said mapping process unit maps the music data on the two-dimensional map by using information of the sound wavelength, amplitude and rhythm, and by judging a music genre tendency.

7. The still image producing apparatus according to claim 1,
wherein the psychological information is color information,
wherein for each of the plurality of image data, in the case where the color information indicates a warm color space, said mapping process unit judges a warm tendency, and maps the image data on the two-dimensional map in accordance with the judged warm tendency, and
wherein for each of the plurality of image data, in the case where the color information indicates a cold color space, said mapping process unit judges a cold tendency, and maps the image data on the two-dimensional map in accordance with the judged cold tendency.

8. The still image producing apparatus according to claim 1,
wherein the physical information is control point data of a subject's face in the image data, and
wherein for each of the plurality of image data, said mapping process unit uses the control point data, and judges a face expression as delight, anger, sorrow or joy, and maps the image data on the two-dimensional map in accordance with the judged face expression.

9. The still image producing apparatus according to claim 1, further comprising:
an image packet generation unit operable to generate image packets in which, for each of the plurality of image data, the image feature quantity is added to the image data;
a music packet generation unit operable to generate music packets in which, for each of the plurality of music data, the music feature quantity is added to the music data;
an image storing unit operable to store the image packets; and
a music storing unit operable to store the music packets, and
said mapping process unit acquires (i) the image feature quantity and (ii) the music feature quantity respectively from (i) the image packets and (ii) the music packets that are respectively recorded in (i) said image storing unit and (ii) said music storing unit, so as to map the plurality of image data and the plurality of music data.

10. The still image producing apparatus according to claim 1, further comprising
a modification unit operable to (i) modify a facial expression, using control point data of a subject's face, or (ii) modify a color tone of an image by changing color information of a pixel, said modification being executed by using at least a portion of the plurality of image data.

11. The still image producing apparatus according to claim 1, further comprising
a score judgment unit operable to judge score information in which, for each of the plurality of image data and the plurality of music data, the image feature quantity and the music feature quantity are quantified,
wherein said production unit produces the slide show by providing visual effects according to the score information.

12. The still image producing apparatus according to claim 11,
wherein said production unit uses the score information, so as to produce the slide show in which the image data with the score information indicating a high score is dynamically displayed for a long time, in a large size, or moved slowly, as the visual effects.

13. The still image producing apparatus according to claim 11,
wherein as the visual effects, said production unit produces (i) the image data and the music data which are used to generate the slide show consecutively from the one of the image data and the music data whose said score information indicates a low score to the one of the image data and the music data whose said score information indicates a high score, or (ii) the image data and the music data which are used to generate the slide show whose said score information indicates a large difference in scores.

14. The still image producing apparatus according to claim 11,
wherein said production unit preferentially produces the slide show with image data and music data which have scores close to a score indicated in the score information that is selected by said input unit.

15. A still image producing method used on a still image producing apparatus which produces a slide show using image data and music data, the method comprising,
extracting, using a music feature extraction unit, a music feature quantity from each of a plurality of music data;
extracting, using an image feature extraction unit, an image feature quantity from each of a plurality of image data;
mapping, using a mapping process unit, the plurality of music data and the plurality of image data on a two-dimensional map by using the music feature quantity extracted from each of the plurality of music data and the image feature quantity extracted from each of the plurality of image data;
receiving, using a reception unit, from a user, a selection of a location on the two-dimensional map, and a request for a production of the slide show; and
reproducing, using a production unit, at least a portion of the plurality of music data and at least a portion of the plurality of image data mapped in said mapping,
wherein the two-dimensional map includes two axes, in which physical information is arranged in a first axis direction and psychological information is arranged in a second axis direction,
in said extracting of the image feature quantity, the image feature quantity including first physical information and first psychological information is extracted from each of the plurality of image data,
in said extracting of the music feature quantity, the music feature quantity including second physical information and second psychological information is extracted for each of the plurality of music data,
in said mapping, the plurality of image data is mapped, based on the first physical information and the first psychological information, on the two-dimensional map defined by the two axes, and the plurality of music data is mapped, based on the second physical information and the second psychological information, on the two-dimensional map defined by the two axes, and
in said reproducing, the slide show is generated using, from among the plurality of image data and the plurality of music data mapped on the two-dimensional map, image data and music data which are mapped on the location received in said receiving.

16. The still image producing method according to claim 15, wherein the map is divided into four quadrants by the two axes, wherein in said mapping, a coordinate system in which the plurality of image data is mapped and a coordinate system in which the plurality of music data is mapped indicate the same feature quantity, and the music data and the image data which are used to generate the slide show are located in the same quadrant on the two-dimensional map.

17. A Read Only Memory (ROM) in which a program is recorded, said program being used on a still image producing apparatus that produces a slide show using image data and music data, the program for causing the still image producing apparatus to perform a method comprising:

extracting a music feature quantity from each of a plurality of music data;

extracting an image feature quantity from each of a plurality of image data;

mapping the plurality of music data and the plurality of image data on a two-dimensional map by using the music feature quantity extracted from each of the plurality of music data and the image feature quantity extracted from each of the plurality of image data;

receiving from a user, a selection of a location on the two-dimensional map, and a request for a production of the slide show; and reproducing at least a portion of the plurality of music data and at least a portion of the plurality of image data mapped in said mapping, wherein the two-dimensional map includes two axes, in which physical information is arranged in a first axis direction and psychological information is arranged in a second axis direction, in said extracting of the image feature quantity, the image feature quantity including first physical information and first psychological information is extracted from each of the plurality of image data, in said extracting of the music feature quantity, the music feature quantity including second physical information and second psychological information is extracted for each of the plurality of music data, in said mapping, the plurality of image data is mapped, based on the first physical information and the first psychological information, on the two-dimensional map defined by the two axes, and the plurality of music data is mapped, based on the second physical information and the second psychological information, on the two-dimensional map defined by the two axes, and in said reproducing, the slide show is generated using, from among the plurality of image data and the plurality of music data mapped on the two-dimensional map, image data and music data which are mapped on the location received in said receiving.

* * * * *